United States Patent
Hosono et al.

(10) Patent No.: US 12,151,288 B2
(45) Date of Patent: Nov. 26, 2024

(54) METAL POWDER PRODUCING APPARATUS AND METAL POWDER PRODUCING METHOD

(71) Applicant: TDK CORPORATION, Tokyo (JP)

(72) Inventors: Masakazu Hosono, Tokyo (JP); Kazuhiro Yoshidome, Tokyo (JP); Yoshiki Kajiura, Tokyo (JP); Hiroyuki Matsumoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/944,834

(22) Filed: Sep. 14, 2022

(65) Prior Publication Data

US 2023/0095146 A1 Mar. 30, 2023

(30) Foreign Application Priority Data

Sep. 30, 2021 (JP) ................. 2021-162089

(51) Int. Cl.
*B22F 9/08* (2006.01)

(52) U.S. Cl.
CPC ...... *B22F 9/082* (2013.01); *B22F 2009/0872* (2013.01)

(58) Field of Classification Search
CPC .... B22F 9/08; B22F 9/082; B22F 2009/0804; B22F 2009/0808; B22F 2009/0812; B22F 2009/0816; B22F 2009/0824; B22F 2009/0828; B22F 2009/0832; B22F 2009/0836; B22F 2009/084; B22F 2009/0844; B22F 2009/0848; B22F 2009/0852; B22F 2009/0856; B22F 2009/086; B22F 2009/0864; B22F 2009/0868; B22F 2009/0872; B22F 2009/0876; B22F 2009/088; B22F 2009/0884; B22F 2009/0888; B22F 2009/0892; B22F 2009/0896; B22F 1/08; B22F 1/05; B22F 2999/00; C22C 33/0278; C22C 2202/02; Y02P 10/25
USPC .......................................... 75/338
See application file for complete search history.

(56) References Cited

U.S. PATENT DOCUMENTS

2017/0239731 A1* 8/2017 Kaneta ................. B22F 9/082

FOREIGN PATENT DOCUMENTS

| GB | 2565653 A | * | 2/2019 | ............. B22F 9/082 |
| JP | H11-80812 A | | 3/1999 | |

* cited by examiner

*Primary Examiner* — Brian D Walck
*Assistant Examiner* — Danielle Carda
(74) *Attorney, Agent, or Firm* — Oliff PLC

(57) ABSTRACT

A metal powder producing apparatus includes a molten metal supply unit, a cylinder body, and a cooling liquid introduction unit. The molten metal supply unit discharges a molten metal. The cylinder body is capable of being formed with a layer of a cooling liquid for cooling the molten metal on an inner circumference surface of the cylinder body. The cooling liquid introduction unit supplies the cooling liquid to an upper inside of the cylinder body. The inner circumference surface of the upper inside of the cylinder body has a substantially elliptical shape.

8 Claims, 10 Drawing Sheets

METAL POWDER PRODUCING APPARATUS AND METAL POWDER PRODUCING METHOD

BACKGROUND OF THE INVENTION

The present invention relates to a metal powder producing apparatus and a metal powder producing method.

For example, as shown in Patent Document 1, a metal powder producing apparatus for producing a metal powder using a so-called gas atomization method and a producing method using the apparatus are known. The conventional apparatus includes a molten metal supply container for discharging a molten metal, a cylinder body provided below the molten metal supply container, and a cooling liquid introduction unit for forming a flow of a cooling liquid for cooling the molten metal discharged from the molten metal supply container along an inner circumference surface of the cylinder body.

The cooling liquid introduction unit forms a cooling liquid layer by spraying a cooling liquid toward a tangent direction of the inner circumference surface of the cooling cylinder body and flowing the cooling liquid down while circling it along the inner circumference surface of the cooling container. When the cooling liquid layer is used, it is expected to rapidly cool a molten drop and produce a metal powder having a high functionality.

In the conventional metal powder production, however, a molten drop may be cooled insufficiently rapidly, and there is a need for apparatus and method capable of producing a higher-quality metal powder.

Patent Document 1: JPH1180812 (A)

BRIEF SUMMARY OF THE INVENTION

The present invention has been achieved under such circumstances. It is an object of the present invention to provide a metal powder producing apparatus capable of producing a higher quality metal powder and a producing method for the metal powder.

To achieve the above object, a metal powder producing apparatus according to the present invention comprises:
- a molten metal supply unit for discharging a molten metal;
- a cylinder body capable of being formed with a layer of a cooling liquid for cooling the molten metal on an inner circumference surface of the cylinder body; and
- a cooling liquid introduction unit for supplying the cooling liquid to an upper inside of the cylinder body,
- wherein the inner circumference surface of the upper inside of the cylinder body has a substantially elliptical shape.

In the metal powder producing apparatus according to the present invention, it is possible to form the cooling liquid layer flowing in a substantially elliptical spiral manner along the inner circumference surface of the cylinder body. The molten metal drop can be cooled more rapidly by spraying the molten metal drop against the cooling liquid layer. The flow speed of the elliptical spiral cooling liquid is faster on the short diameter side of the ellipse and slower on the long diameter side of the ellipse, and the molten metal drop sprayed against the cooling liquid layer is flowed in the cooling liquid layer together with the cooling liquid while changing the flow speed.

Since the molten metal drop flows in the cooling liquid layer together with the cooling liquid while changing the flow speed, the vapor film around the molten metal drop, which is considered to be generated immediately after the contact with the cooling liquid, is easily peeled from the molten metal drop, and the rapid cooling effect of the molten metal drop in the cooling liquid layer is enhanced. A metal powder having good amorphousness and magnetic characteristics even with a fine particle size can be produced by rapidly cooling the molten metal drop in such a manner.

Preferably, the cooling liquid introduction unit includes a cooling liquid discharge port for discharging the cooling liquid, supplied from outside the cylinder body, in a spiral orbit flow along the inner circumference surface from an upper part of the cylinder body. In this configuration, the cooling liquid discharge port can form the cooling liquid layer in an elliptical spiral manner from the upper portion of the cylinder body toward the lower portion of the cylinder body along the inner circumference surface, the rapid cooling effect of the molten metal drop in the cooling liquid layer is enhanced, and a metal powder having good amorphousness and magnetic characteristics even with a fine particle size can be obtained.

Preferably, the cooling liquid discharge port is formed in a substantially elliptical shape over a circumference direction of the cylinder body. The cooling liquid discharge port may be continuously formed in a substantially elliptical shape over the circumferential direction of the cylinder body or may be formed intermittently over the circumferential direction of the cylinder body by, for example, providing the cooling liquid discharge port with a reinforcing member. When the cooling liquid discharge port is continuously formed over the circumferential direction of the cylinder body, it is easy to form the cooling liquid layer of the cooling liquid flowing in an elliptical spiral manner along the inner circumference surface of the cylinder body.

Preferably, the cooling liquid introduction unit includes a frame for changing a flow of the cooling liquid from outside toward inside to a flow of the cooling liquid along the inner circumference surface of the cylinder body, and the frame includes a substantially elliptical inner frame piece having a diameter smaller than that of the inner circumference surface of the cylinder body. In this configuration, a substantially elliptical cooling liquid discharge port can be formed between the inner frame piece and the inner circumference surface of the cylinder body. As a result, the cooling liquid flowing in an elliptical spiral manner along the inner circumference surface of the cylinder body can be discharged from the cooling liquid discharge port.

Preferably, the frame defines an inside space disposed inside the cylinder body to receive the cooling liquid from the outside to the inside of the cylinder body, and the inside space is formed in a substantially elliptical shape along the inner circumference surface. In this configuration, the cooling liquid can form an elliptical flow along the inner circumference surface in the inside space. When the cooling liquid is discharged downward along the core axis of the cylinder body along the inner circumference surface, an elliptical spiral cooling liquid layer can be formed smoothly along the inner circumference surface.

Preferably, the cooling liquid introduction unit includes an outside formation member for forming an outside space for temporarily storing the cooling liquid, the outside formation member is formed outside the cylinder body, and the outside space is formed in a substantially elliptical shape. In this configuration, the cooling liquid is introduced into the inside of the cylinder body while circling in an elliptical manner in the outside space, and it is easy to smoothly form the cooling liquid layer of the cooling liquid flowing in an elliptical spiral manner along the inner circumference surface of the cylinder body.

Preferably, the cooling liquid discharge port is formed between the inner circumference surface of the cylinder body and the inner frame piece. The inner circumference surface of the cylinder body may be an inner circumference surface of an auxiliary cylinder body. Preferably, a lower end of a passage portion connecting between the outside space and the inside space of the cooling liquid introduction unit is disposed above along the core axis.

Preferably, a center of an ellipse defined by the inner circumference surface is displaced so as to be inclined to a vertical line toward a lower part of the cylinder body. In this configuration, the cooling liquid of the cooling liquid layer formed along the inner circumference surface flows while drawing an elliptical spiral orbit and being inclined to the vertical direction. Thus, the distance of the elliptical spiral through which the cooling liquid flows can be increased. When the molten metal is sprayed downward in the vertical direction, the molten metal drop easily enters the cooling liquid layer without disturbing the cooling liquid flow, and the droplets are easily smoothly cooled.

Preferably, a ratio of a long diameter to a short diameter in an ellipse defined by the inner circumference surface is 1.04 or more and 3.00 or less. In this configuration, it is easy to form a cooling liquid layer with a uniform thickness while changing the flow speed of the cooling liquid.

A ring may be formed in a substantially elliptical shape along the inner circumference surface at the lower portion of the cylinder body. In this configuration, the ring controls the cooling liquid flow toward the direction along the core axis of the cylinder body, and it is easy to maintain a constant thickness of the cooling liquid layer of the cooling liquid flowing in an elliptical spiral manner along the inner circumference surface of the cylinder body.

To achieve the above object, a metal powder producing method according to the present invention comprises steps of:
 forming a layer of a cooling liquid whose flow speed changes along an inner circumference surface of a cylinder body;
 discharging a molten metal from a molten metal supply unit toward the layer of the cooling liquid; and
 flowing the molten metal together with the cooling liquid while changing their flow speed.

In this configuration, the rapid cooling effect of the molten metal drop is enhanced, and a metal powder having good amorphousness and magnetic characteristics even with a fine particle size can be produced.

Preferably, the layer of the cooling liquid is formed by flowing the cooling liquid in a substantially elliptical spiral manner along the inner circumference surface. In this configuration, the molten metal droplet flows along the inner circumference surface while changing the flow speed together with the cooling liquid, and the rapid cooling effect of the molten metal drop can be enhanced.

BRIEF DESCRIPTION OF THE DRAWING(S)

DETAILED DESCRIPTION OF THE INVENTION

Hereinafter, the present invention is described based on the embodiments shown in the figures.

First Embodiment

Figure 1A:
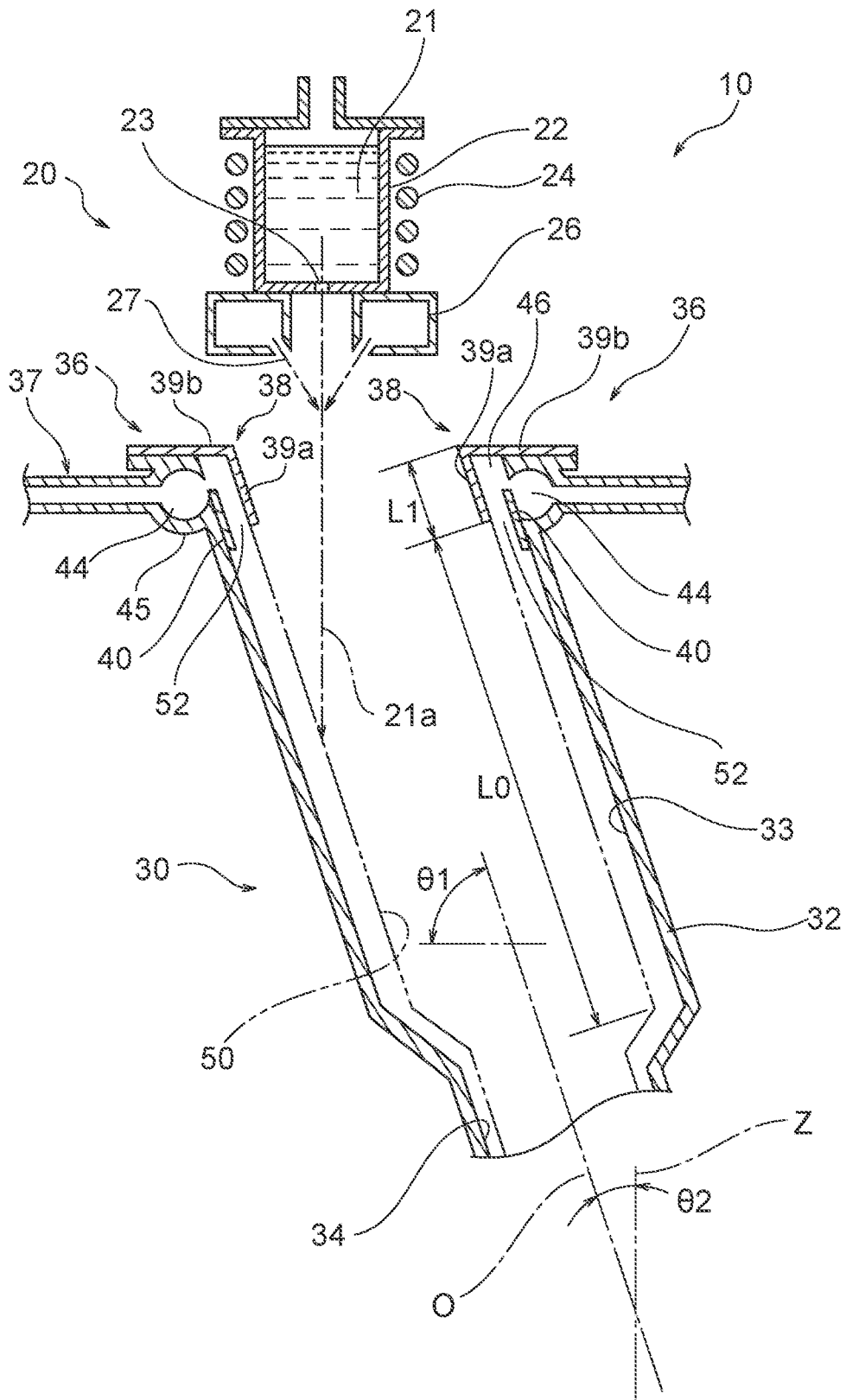
FIG. 1A is a schematic cross-sectional view of a metal powder producing apparatus according to an embodiment of the present invention.

As shown in FIG. 1A, a metal powder producing apparatus 10 according to an embodiment of the present invention is an apparatus for turning a molten metal 21 into powder by an atomization method (gas atomization method) so as to obtain a metal powder constituted from multiple metal particles. The apparatus 10 includes a molten metal supply unit 20 and a cooling unit 30 disposed below the metal supply unit 20 in the vertical direction. In the figures, the vertical direction is the direction along the Z-axis.

The molten metal supply unit 20 includes a heat resistance container 22 for containing the molten metal 21. A heating coil 24 is disposed at the outer circumference of the heat resistance container 22, and the molten metal 21 contained in the container 22 is heated and maintained in a molten state. A molten metal discharge port 23 is formed at the bottom of the container 22, and the molten metal 21 is discharged as a molten metal drop 21a from the molten-metal discharge port 23 toward an inner circumference surface 33 of the cylinder body 32 constituting the cooling unit 30.

A gas spray nozzle 26 is disposed around the molten-metal discharge port 23 at the outer side of the outer bottom wall of the container 22. The gas spray nozzle 26 is provided with a gas spray port 27. A high pressure gas is sprayed from the gas spray port 27 toward the molten metal drop 21a discharged from the molten metal discharge port 23. The high pressure gas is sprayed diagonally downward from the entire circumference of the molten metal discharged from the molten metal discharge port 23, and the molten metal drop 21a is formed into multiple liquid drops and moved toward the inner circumference surface 33 at the upper inside of the cylinder body 32 along the gas flow.

The molten metal 21 may include any elements and can be, for example, at least one selected from Ti, Fe, Si, B, Cr, P, Cu, Nb, and Zr. Since these elements are highly active, the molten metal 21 including these elements is easily oxidized to form an oxide film by contact with the air for a short period of time and is difficult to be fine. In the metal powder producing apparatus 10, as mentioned above, since an inactive gas is employed as the gas sprayed from the gas spray port 27 of the gas spray nozzle 26, even the molten metal 21, which is easily oxidized, can be easily turned into powder.

The gas sprayed from the gas spray port 27 is preferably an inactive gas, such as nitrogen gas, argon gas, and helium gas, or a reducing gas, such as ammonia decomposition gas, but may be the air if the molten metal 21 is a metal that hardly oxidize.

In the present embodiment, at least the inner circumference surface 33 at the upper inside (the portion to which the molten metal drop 21a is supplied) of the cylinder body 32 shown in FIG. 1A has a substantially elliptical shape in an inclined cross section (e.g., a cross section substantially perpendicular to the Z-axis) at an angle $\theta 1$ to a core axis O of the cylinder body 32. The angle $\theta 1$ can be expressed as $\theta 1 = (90 \text{ degrees} - \theta 2)$, assuming that the core axis O of the cylinder body 32 is inclined to the Z-axis at an angle $\theta 2$.

In the cross section inclined at the angle $\theta 1$ to the core axis O of the cylinder body 32, preferably, the major axis of the ellipse of the inner circumference surface 33 corresponds with the inclined direction of the core axis O of the cylinder body 32 to the Z-axis (vertical line). That is, preferably, the cylinder body 32 is configured so that the major axis of the ellipse is included in a plane including the core axis O of the cylinder body 32 and the Z-axis intersecting the core axis O.

Figure 3A:
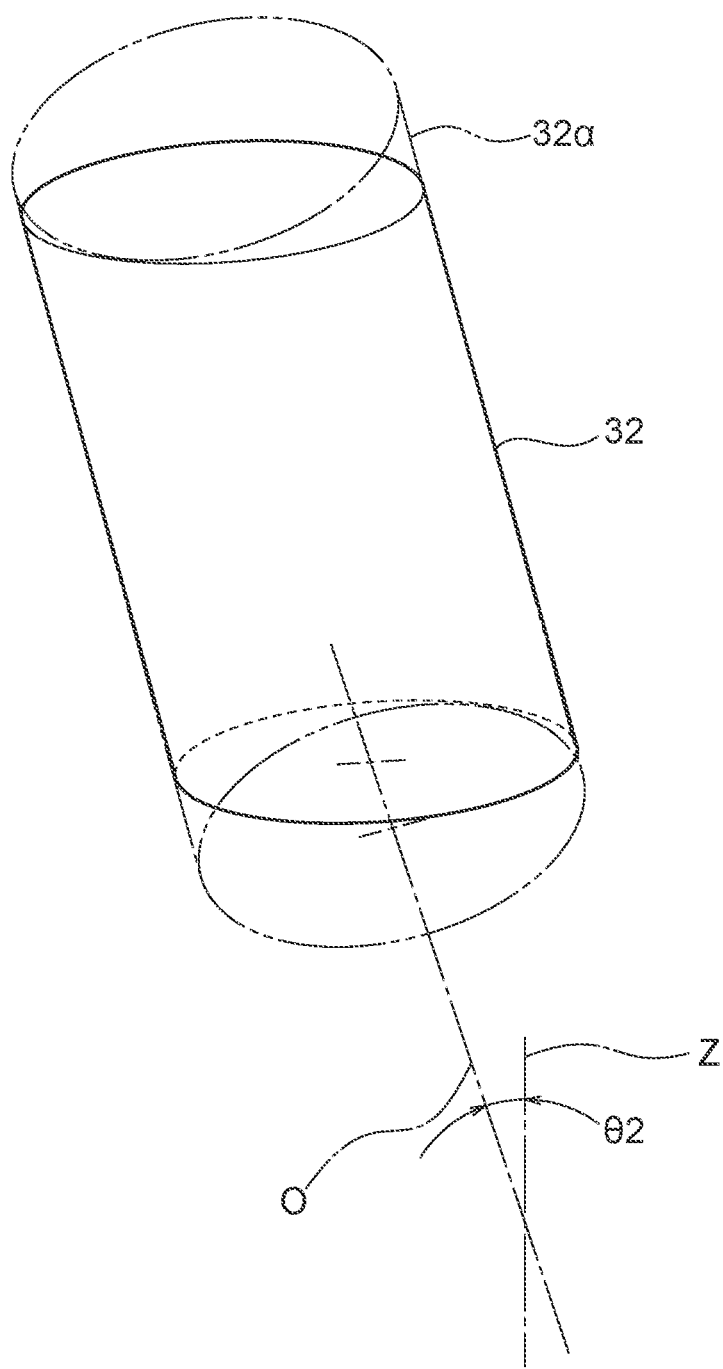
FIG. 3A is a schematic view illustrating the structure of a cylinder body according to the metal powder producing apparatus shown in FIG. 1A.

For example, as shown in FIG. 3A, the cylinder body 32 configured in this manner can be manufactured from a cylindrical member 32a having a circular inner circumference surface of a cross section perpendicular to the core axis O. That is, the cylinder body 32 shown in FIG. 1 can be formed by horizontally cutting the upper and lower portions of the cylindrical member 32a with the core axis O of the cylindrical member 32a inclined at a predetermined angle $\theta 2$ to the vertical direction (Z-axis direction). In the present embodiment, the inner circumference surface 33 of the cylinder body 32 has a substantially elliptical inner circumference surface 33 of the same size continuously formed along the core axis O in a cross section inclined to the core axis O at the angle $\theta 1$.

Figure 2A:
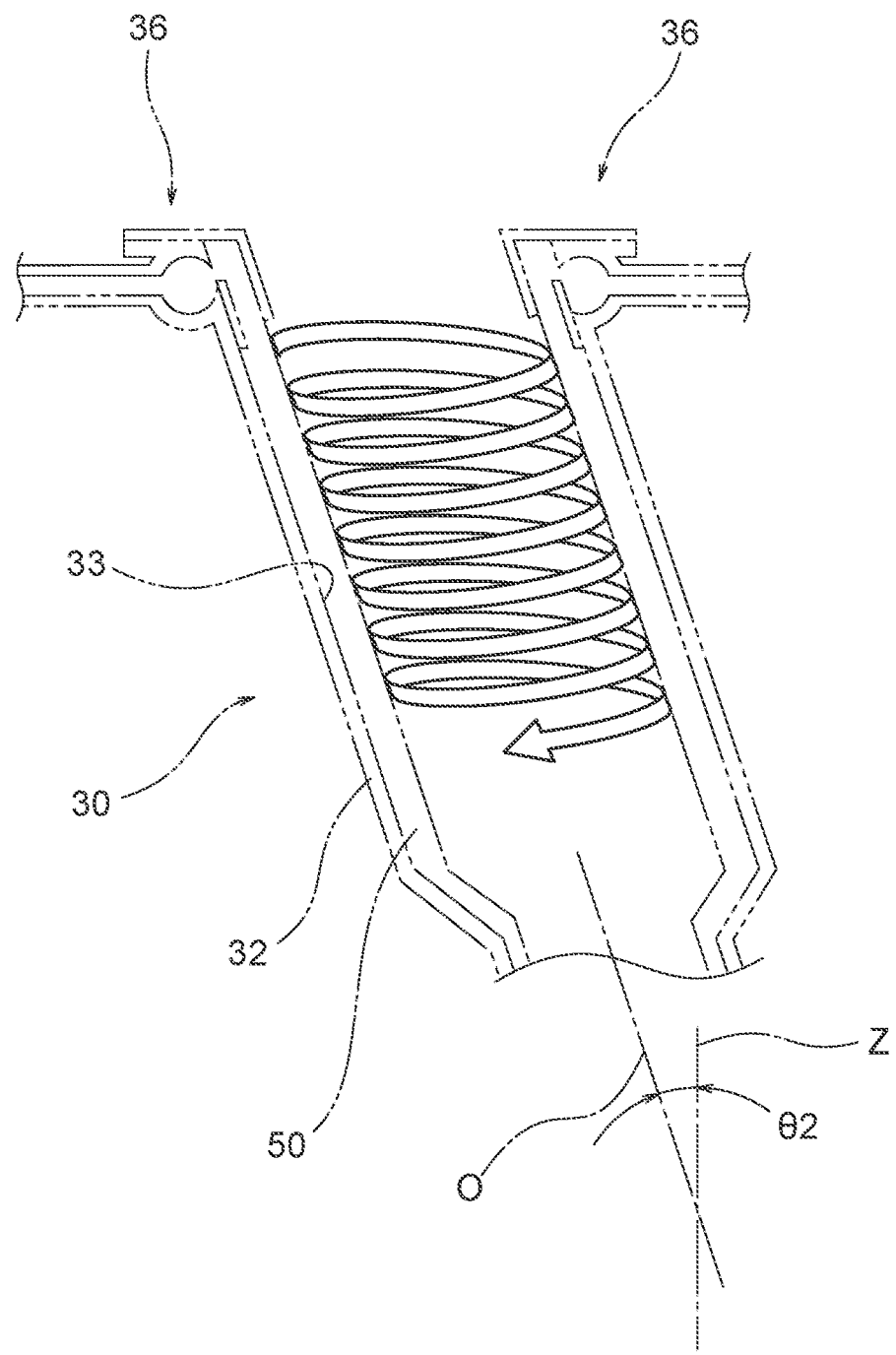
FIG. 2A is a schematic view of a cooling liquid flow in the metal powder producing apparatus shown in FIG. 1A viewed from side.
Figure 2B:
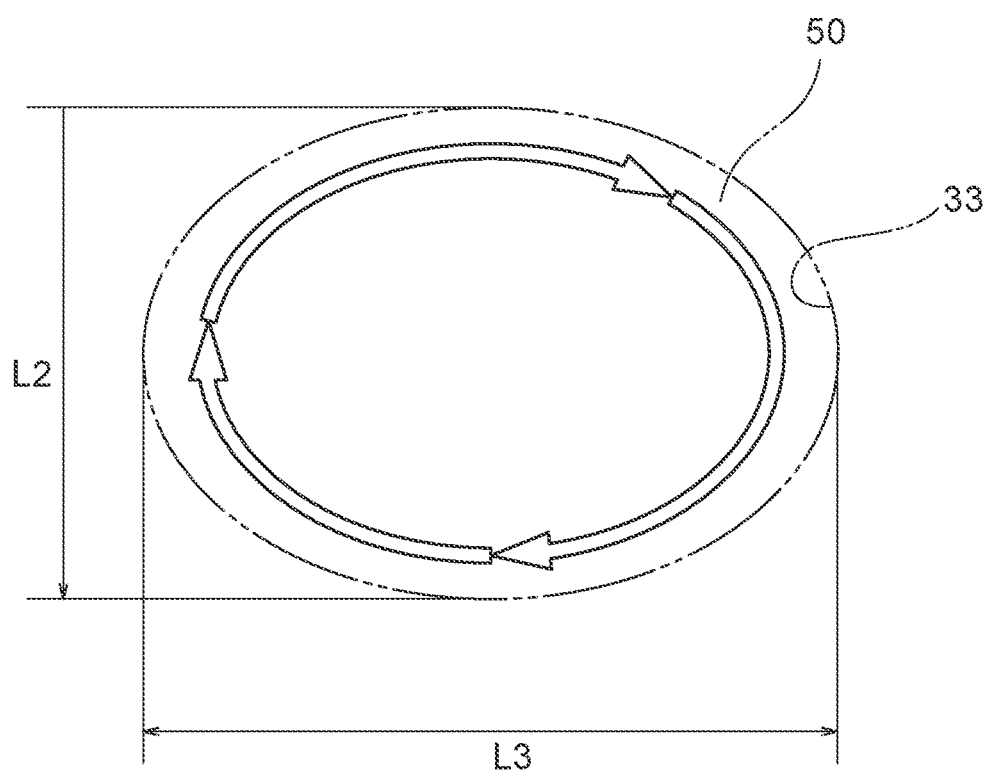
FIG. 2B is a schematic view of the cooling liquid flow shown in FIG. 2A viewed from the vertical direction.

In the present embodiment, as shown in FIG. 2B, a ratio (L3/L2) of a long diameter L3 to a short diameter L2 in the elliptical shape appearing in each horizontal cross section of the inner circumference surface 33 of the cylinder body 32 is preferably 1.01 or more and 3.00 or less, more preferably 1.04 or more and 2.00 or less, and particularly preferably 1.04 or more and 1.30 or less. In this configuration, it is easy to form a cooling liquid layer with a uniform thickness while changing the flow speed of the cooling liquid (e.g., cooling water). For example, when L3/L2 is 1.04 to 3.00, the speed ratio (maximum speed/minimum speed) of the flow speed of the cooling liquid can be changed to about 1.07 to 1.33, although changed depending on the flow speed, fluid pressure, thickness, etc. of the cooling liquid layer.

As shown in FIG. 1A, a discharge port 34 is provided below along the core axis O of the cylinder body 32. The discharge port 34 can discharge the metal powder contained and flowed in the cooling liquid layer 50 to the outside together with the cooling liquid. The inner diameter of the inner circumference surface of the discharge port 34 may be smaller than the inner diameter of the inner circumference surface 33 of the cylinder body 32 and preferably continuously becomes smaller from the inner circumference surface 33 of the cylinder body 32 toward the inner circumference surface of the discharge port 34. The horizontal cross section of the inner circumference surface of the discharge port 34 is not necessarily elliptical and may be circular. Preferably, the horizontal cross section of the inner circumference surface 33 of the cylinder body 32 is an ellipse of the same size from the upper part of the cylinder body 32 toward the discharge port 34 along the core axis O.

Figure 1B:
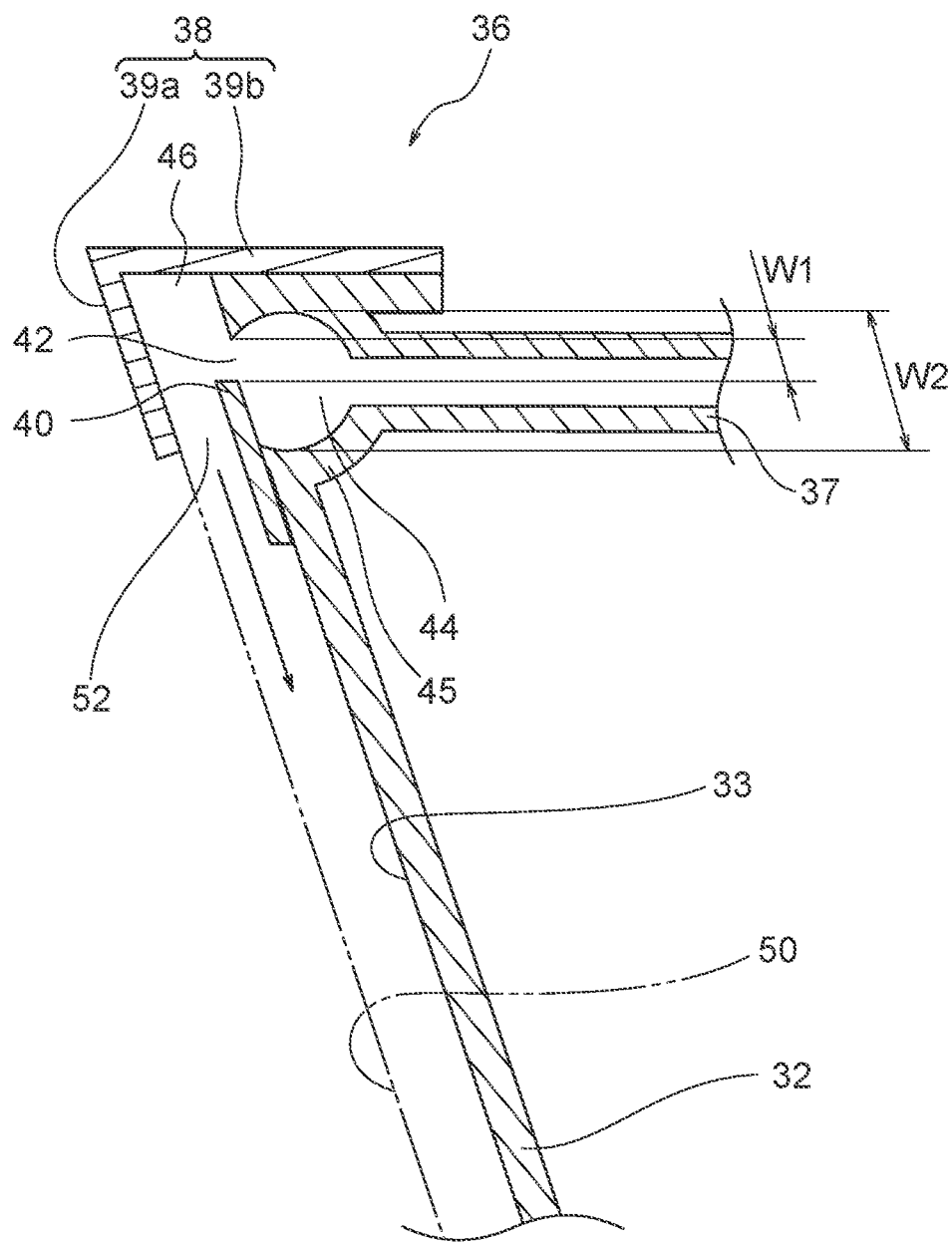
FIG. 1B is an enlarged cross-sectional view of a main part of the metal powder producing apparatus shown in FIG. 1A.

A cooling liquid introduction unit 36 is provided at the upper portion along the core axis O of the cylinder body 32. As shown in FIG. 1B, the cooling liquid introduction unit 36 includes a frame 38 and an outer formation member (outer-frame formation member) 45. The outer formation member 45 may be formed integrally with the cylinder body 32 or may be formed separately from the cylinder body 32 and attached to the cylinder body 32.

The outer formation member 45 defines an outside space 44 on the outside of the inner circumference surface 33 at the upper portion of the cylinder body 32. Moreover, an auxiliary cylinder body 40 is mounted on the inner circumference surface of the upper portion of the cylinder body 32. The auxiliary cylinder body 40 may be the upper end opening edge of the cylinder body 32 itself. In the illustrated example, however, the auxiliary cylinder body 40 is formed separately from the cylinder body 32 and mounted on the inner circumference surface of the upper portion of the cylinder body 32. The inner circumference surface of the auxiliary cylinder body is preferably flush with the inner circumference surface 33 of the cylinder body 32, but may be different.

Figure 1C:
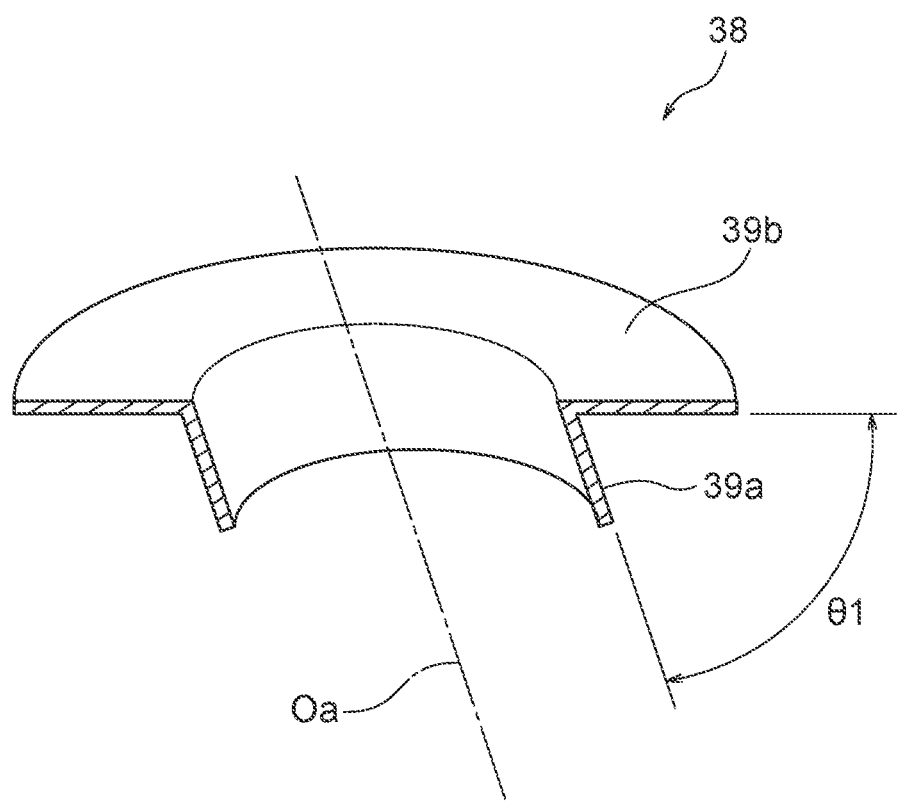
FIG. 1C is an enlarged cross-sectional perspective view of a main part of the metal powder producing apparatus shown in FIG. 1A.

The frame 38 may be formed integrally with the cylinder body 32, but is preferably formed separately from the cylinder body 32 and includes an inner frame piece 39a disposed on the inner side of the inner circumference surface of the cylinder body 32 and a frame support piece 39b intersecting the inner frame piece 39a at a predetermined angle. As shown in FIG. 1C, the frame support piece 39b is a plate piece having a substantially elliptical ring shape, and the inner frame piece 39a has a substantially elliptical cylindrical shape with a center axis Oa inclined at an angle $\theta 1$ from the substantially elliptical central opening edge of the frame support piece 39b (to the direct axis of the ellipse).

The core axis Oa of the inner frame piece 39a shown in FIG. 1C corresponds with the core axis O of the cylinder body 32 shown in FIG. 1A, and the horizontal cross section of the outer circumference surface of the inner frame piece 39a has a similar elliptical shape with an inner diameter smaller than that of the ellipse of the horizontal cross section of the inner circumference surface 33 of the cylinder body 32 shown in FIG. 1A (or the inner circumference surface of the auxiliary cylinder body 40). That is, the outer circumference surface of the inner frame piece 39a has a diameter smaller than that of the inner circumference surface 33 of the cylinder body 32 (or the inner circumference surface of the auxiliary cylinder body 40) and is parallel thereto.

As shown in FIG. 1A, the outer diameter portion of the frame support piece 39b is attached to the upper end of the outer formation member 45 or the upper end of the cylinder body 32. Instead, the outer diameter portion of the frame support piece 39b may be formed integrally with the upper end of the outer formation member 45 or the upper end of the cylinder body 32. The inner diameter portion of the frame support piece 39b and the inner frame piece 39a define an inside space 46 on the inner side of the inner circumference surface 33 at the upper portion of the cylinder body 32 together with the inner circumference surface of the cylinder body 32, the inner circumference surface of the auxiliary cylinder body 40, and/or the inner circumference surface of the outer formation member 45.

As shown in FIG. 1B, the outer formation member 45 defines the outside space 44 on the outer side of the inner circumference surface 33 at the upper portion of the cylinder body 32 together with the cylinder body 32 (including the auxiliary cylinder body 40). The inside space 46 is located radially on the inner side of the outside space and communicates with the outside space 44 via a passage portion 42. The upper end of the auxiliary cylinder body 40 or the cylinder body 32 is located between the outside space 44 and the inside space so that the passage portion 42 is formed at or near the top of the outside space 44 along the core axis O of the cylinder body 32.

In the present embodiment, the outside space 44 is formed in a substantially elliptical ring shape continuing horizontally on the outside of the inner circumference surface 33 of the cylinder body 32. The inside space 46 is formed in a substantially elliptical ring shape continuing horizontally along the inner circumference surface 33 on the inside of the inner circumference surface 33 of the cylinder body 32. Likewise, the passage portion 42 is also formed in a substantially elliptical ring shape continuing horizontally. A vertical width W1 along the core axis O of the passage portion 42 is smaller than a vertical width W2 in the core axis direction of the outside space 44. Preferably, W1/W2 is ½ or less.

A cooling liquid supply line 37 for introducing a cooling liquid is attached to the radially outer side of the outer formation member 45. Preferably, a connection port from the supply line 37 to the outside space 44 is located below the passage portion 42 along the core axis O.

In the outside space 44, preferably, the cooling liquid flowing from the supply line 37 goes from the bottom to the top of the outside space and enters the inside space 46 from the passage portion 42. In addition, preferably, the lower end of the inner frame piece 39a for defining the inside space 46 is located below the passage portion 42 along the core axis O. A cooling liquid discharge port 52 is formed between the lower end of the inner frame piece 39a and the inner circumference surface 33 (including the inner circumference surface of the auxiliary cylinder body 40) of the cylinder body 32. As shown in FIG. 1C, the lower end of the inner frame piece 39a defines a substantially elliptical opening on the horizontal plane.

The inner diameter of the cooling liquid discharge port 52 corresponds with the outer diameter of the inner frame piece 39a, and the outer diameter of the cooling liquid discharge port 52 corresponds with the inner circumference surface of the cylinder body 32 (the inner diameter of the auxiliary cylinder body 40). Preferably, the cooling liquid discharge port 52 is formed in a substantially elliptical ring shape continuing along the circumferential direction in the horizontal cross section.

The cooling liquid discharge port 52 is connected to the inside space 46, and the cooling liquid in the inside space 46 is blown out in an elliptical spiral manner from the cooling liquid discharge port 52 toward the inner circumference surface 33 of the cylinder body 32. In the present embodiment, the radial width of the cooling liquid discharge port 52 is not limited, but corresponds with the thickness of the cooling liquid layer 50 of the cooling liquid flowing along the inner circumference surface of the cylinder body 32 and is determined in relation to it.

As shown in FIG. 1A, the axial length L1 of the inner frame piece 39a is a length covering the width W1 in the core axis O of the passage portion 42 shown in FIGS. 1B and 1s determined so that the cooling liquid discharge port 52 is formed on the upstream side of the contact position between the molten metal discharged from the molten metal supply unit 20 and the cooling liquid layer 50. Moreover, as shown in FIG. 1A, the axial length L1 of the inner frame piece 39a is determined so that the liquid surface of the cooling liquid layer 50 having a sufficient axial length L0 is exposed on the inner circumference surface 33 of the cylinder body 32.

Preferably, the length L0 along the core axis O of the cooling liquid layer 50 exposed inside is 5 to 500 times larger than the axial length L1 of the inner frame piece 39a. The inner diameter (short diameter of the ellipse) of the inner circumference surface 33 of the cylinder body 32 is not limited, but is preferably 50 to 500 mm.

In the present embodiment, the cooling liquid supply line 37 may be connected in the tangential direction of the cooling liquid introduction unit 36. The cooling liquid can enter the inside of the outside space 44 from the cooling liquid supply line 37 so as to rotate around the core axis O in an elliptical spiral manner. The cooling liquid entered in the inside of the outside space 44 in a spiral manner passes through the passage portion 42 and enters the inside of the inside space 46 in a spiral manner.

In the present embodiment, in the cooling liquid introduction unit 36, the cooling liquid is temporarily stored in the outside space 44 disposed outside the cylinder body 32. The outside space 44 is formed in a substantially elliptical shape. In this configuration, the cooling liquid is introduced into the inside space 46 while circling in an elliptical manner in the outside space 44.

In the present embodiment, since the lower end of the passage portion 42 is formed above the lower end of the outside space 44, the cooling liquid is once lifted upward while circling in an elliptical spiral manner in the outside space 44 and enters the inside space 46 via the passage portion 42. Since the cooling liquid entering the inside space 46 located at the upper inside of the cylinder body 32 passes through the passage portion 42, the flow speed of the cooling liquid increases, and the cooling liquid collides with the inner frame piece 39a of the inside space 46 so as to change its flow direction.

The cooling liquid passing through the passage portion 42 provided at the upper part of the cylinder body 32 and entering the inside of the inside space 46 in an elliptical spiral manner changes its flow downward along the inner frame piece 39a (along the core axis O). The frame support piece 39b blocks the upward flow of the cooling liquid. The cooling liquid forms an elliptical ring flow along the inner circumference surface 33 around the core axis O in the inside space 46. Moreover, gravity acts downward along the inner circumference surface 33 (along the core axis O), and the cooling liquid is discharged from the cooling liquid discharge port 52 along the inner circumference surface 33 so as to flow in a substantially elliptical spiral orbit due to the synergistic effect with gravity. The cooling liquid discharged from the cooling liquid discharge port 52 forms the cooling liquid layer 50 in which the cooling liquid flows in an elliptical spiral manner with a substantially constant thickness along the inner circumference surface 33.

In the present embodiment, as shown in FIG. 1A, since the cooling liquid is supplied from the cooling liquid introduction unit 36 to the inner circumference surface 33 formed in an ellipse shape at the upper inside of the cylinder body 32, the cooling liquid can form the cooling liquid layer 50 flowing in a substantially elliptical spiral manner along the inner circumference surface 33 of the cylinder body 32. The molten metal drop 21a, which is a droplet of the molten metal 21, can be cooled more rapidly by spraying the molten metal drop 21a onto the inner liquid surface of the cooling liquid layer 50. As shown in FIG. 2A and FIG. 2B, the flow speed of the elliptical spiral cooling liquid is faster on the short diameter side of the ellipse and slower on the long diameter side of the ellipse, and the molten metal drop 21a sprayed against the cooling liquid layer 50 is flowed in the cooling liquid layer 50 together with the cooling liquid while changing the flow speed.

Since the molten metal drop 21a flows in the cooling liquid layer 50 together with the cooling liquid while changing the flow speed, the vapor film around the molten metal drop 21a, which is considered to be generated immediately after the contact with the cooling liquid, is easily peeled from the molten metal drop 21a, and the molten metal drop 21a is easily rapidly cooled by the cooling liquid layer 50. A metal powder having good amorphousness and magnetic characteristics even with a fine particle size can be produced by rapidly cooling the molten metal drop 21a in such a manner.

In the present embodiment, as shown in FIG. 1A, the cooling liquid discharge port 52 is continuously formed in a substantially elliptical shape over the circumferential direction of the cylinder body 32, but may be formed intermittently over the circumferential direction of the cylinder body 32 by, for example, providing the cooling liquid discharge port 52 with a reinforcing member. When the cooling liquid discharge port 52 is continuously formed over the circumferential direction of the cylinder body 32, it is possible to form the cooling liquid layer 50 of the cooling liquid flowing in an elliptical spiral manner along the inner circumference surface 33 of the cylinder body 32.

In the present embodiment, as shown in FIG. 1A, the cooling liquid introduction unit 36 can form a substantially elliptical cooling liquid discharge port 52 between the inner frame piece 39a and the inner circumference surface 33 of the cylinder body 32. As a result, the cooling liquid flowing in an elliptical spiral manner along the inner circumference surface 33 of the cylinder body 32 can be discharged from the cooling liquid discharge port 52.

In the present embodiment, as shown in FIG. 1A, the center of the ellipse formed by the inner circumference surface 33 is displaced so as to be inclined at an angle θ2 to the vertical line (Z-axis) toward the lower part of the cylinder body 32. As shown in FIG. 2A, the cooling liquid of the cooling liquid layer 50 formed along the inner circumference surface 33 flows while drawing an elliptical spiral orbit and being inclined to the vertical direction (gravity direction).

Thus, the distance of the elliptical spiral through which the cooling liquid flows can be increased on condition that the length in the Z-axis is constant. When the molten metal is sprayed in the gravity direction against one end along the long diameter of the ellipse of the inner circumference surface 33 of the cylinder body 32, the molten metal drop 21a easily enters the inner circumference surface 33 (cooling liquid layer 50) of the cylinder body 32 from the upper end opening of the cylinder body 32, and the droplets can be cooled smoothly.

In the above-mentioned embodiment, the horizontal cross section of the inner circumference surface 33 of the cylinder body 32 is an ellipse of the same size from the upper portion of the cylinder body 32 toward the discharge port 34 along the core axis O, but the horizontal cross section of the inner circumference surface 33 of the cylinder body 32 has a substantially elliptical shape at least in the upper portion of the cylinder body 32 and may have a shape changing in the middle toward the discharge port 34 along the core axis O, for example, gradually changing from a substantially elliptical shape to a substantially circular shape (or another shape).

In the horizontal cross section of the inner circumference surface 33 of the cylinder body 32, a ratio (L3/L2) of a long diameter L3 to a short diameter L2 in an ellipse is preferably constant from the upper portion of the cylinder body 32 toward the discharge port 34 along the core axis O, but may be changed. For example, the ratio (L3/L2) may be changed so as to be smaller, larger, or alternately smaller or larger from the upper portion of the cylinder body 32 toward the discharge port 34 along the core axis O.

In the horizontal cross section of the inner circumference surface 33 of the cylinder body 32, the direction of the long diameter of the ellipse may be changed gradually from the upper portion of the cylinder body 32 toward the discharge port 34 along the core axis O. For example, the direction of the long diameter of the ellipse may correspond with the inclination direction of the core axis O of the cylinder body 32 in the upper portion of the cylinder body 32, and the direction of the long diameter of the ellipse may be changed so as to be substantially perpendicular to the inclination direction of the core axis O of the cylinder body 32 in the lower portion of the cylinder body 32.

In the present embodiment, the predetermined angle θ2 of the core axis O of the cylinder body 32 to the vertical direction is not limited, but is preferably 5 to 45 degrees. In such an angle range, the molten metal drop 21a from the molten metal discharge port 23 can be easily discharged against the cooling liquid layer 50 formed on the inner circumference surface 33 of the cylinder body 32.

In the present embodiment, the cooling liquid introduction unit 36 is formed so that the frame support piece 39b is horizontal, but the present invention is not limited to this as long as the cooling liquid introduction unit 36 is configured so as to discharge the cooling liquid layer 50 in an elliptical spiral manner.

Second Embodiment

Figure 4:
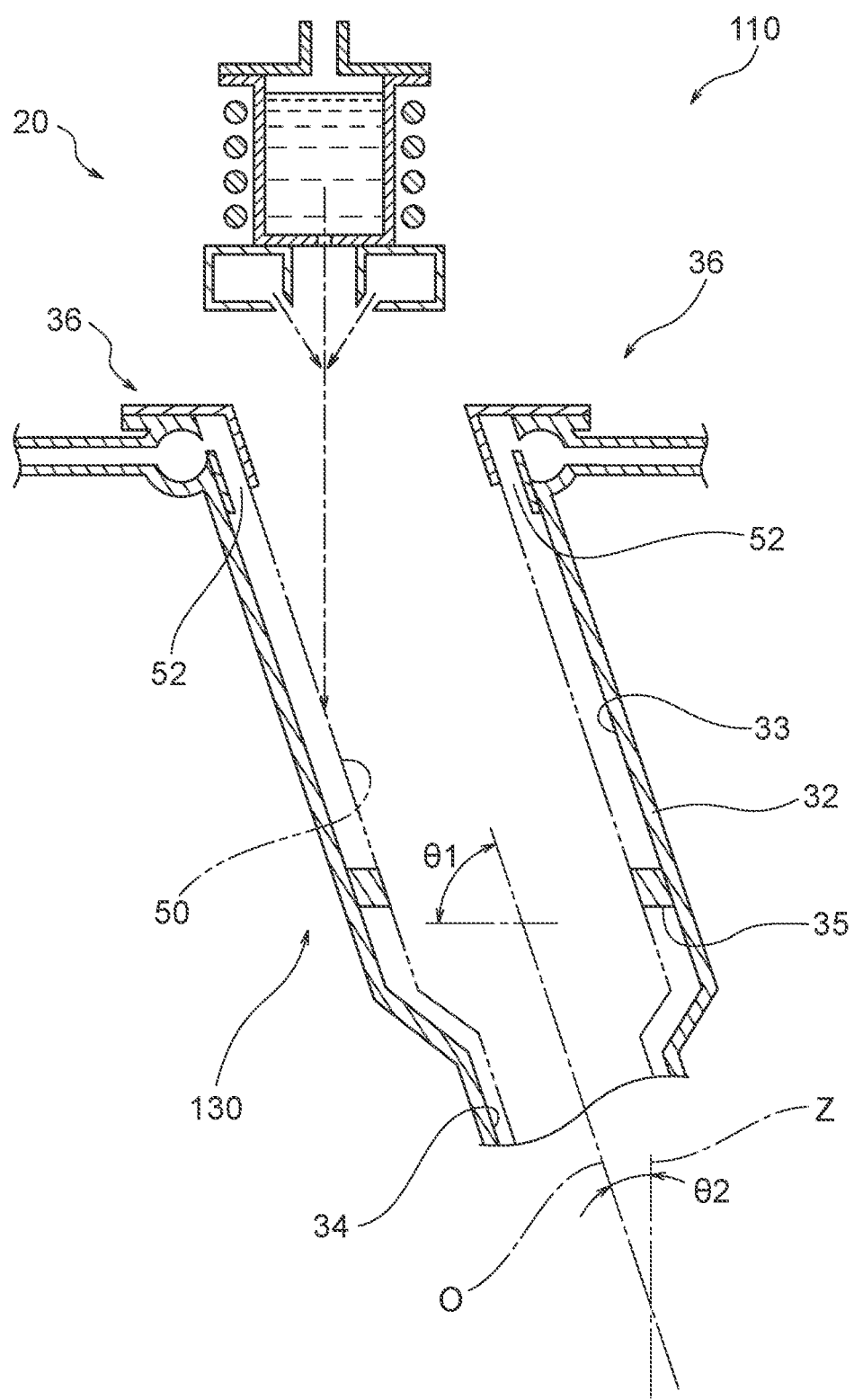
FIG. 4 is a schematic cross-sectional view of a metal powder producing apparatus according to another embodiment of the present invention.

As shown in FIG. 4, a metal powder producing apparatus 110 and a metal powder producing method according to another embodiment of the present invention are similar to those of First Embodiment except for the following respects. The common members are provided with the common names and references. The common respects are not partly described.

A ring 35 is fixed on the downstream side of the inner circumference surface 33 of the cylinder body 32 constituting the cooling unit 30. The ring 35 functions as a weir (or baffle plate) on the downstream side of the cooling liquid layer 50 on the inner circumference surface 33 of the cylinder body 32. Since the flow in the direction of the core axis O is blocked by the ring 35, the cooling liquid layer 50 has a predetermined thickness and flows over the ring 35 to the lower portion of the cylinder body 32. Since the ring 35 is provided on the downstream side of the cooling liquid layer 50, the ring 35 controls the flow of the cooling liquid in the direction along the core axis O of the cylinder body 32, and it is easy to maintain a constant thickness of the cooling liquid layer 50.

In the present embodiment, the ring 35 is attached at an angle θ1 to the core axis O of the cylinder body 32 and formed in an elliptical ring shape along the inner circumference surface 33 of the cylinder body 32. The radial thickness of the ring 35 corresponds with the radial thickness of the cooling liquid layer 50 and is preferably substantially the same as the radial width of the discharge port 52.

The present invention is not limited to the above-mentioned embodiments and may variously be modified within the scope of the present invention.

Figure 3B:
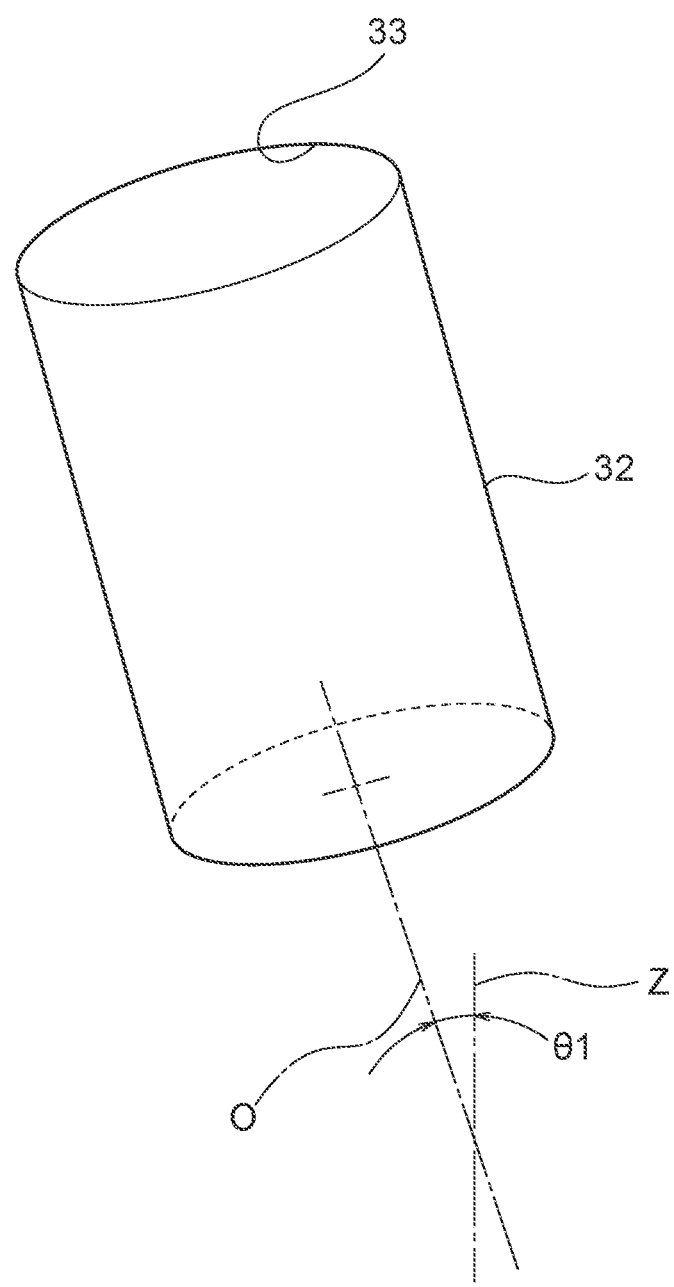
FIG. 3B is a schematic view illustrating the structure of a modification of the cylinder body shown in FIG. 1A.

For example, unlike the above-mentioned embodiments, instead of the cylindrical member 32α having the circular inner circumference surface 33 perpendicular to the core axis O shown in FIG. 3A, the cylinder body 32 may be an elliptical cylindrical member previously having a substantially elliptical cross section of the inner circumference surface perpendicular to the core axis O as shown in FIG. 3B.

In the embodiment shown in FIG. 3A, the inner circumference surface 33 inclined to the core axis O is formed in an elliptical shape by cutting the cylindrical member 32a. As shown in FIG. 3B, however, a cylindrical member previously having an elliptical cross section of the inner circumference surface 33 perpendicular to the core axis O may be employed. In First Embodiment mentioned above, as shown in FIG. 2A, an elliptical spiral flow is formed in which the center of the ellipse horizontal around the Z-axis changes along the core axis O of the cylinder body. In the present embodiment, however, an elliptical spiral flow is formed in which the center of the ellipse perpendicular to the core axis O along the inner circumference surface 33 of the cylinder body moves along the core axis O.

EXAMPLES

Hereinafter, the present invention is described based on more detailed examples, but the present invention is not limited to the examples.

EXAMPLES

Metal powders composed of Fe—Si—B (Experiment No. 7), Fe—Si—Nb—B—Cu (Experiment No. 8), Fe—Si—B—P—Cu (Experiment No. 10), Fe—Nb—B (Experiment No. 12), Fe—Zr—B (Experiment No. 13), and Fe—Co—Si—B—P—Cu (Experiment No. 14) were produced using a metal powder producing apparatus 10 having an angle θ2 shown in FIG. 1A of 25 degrees and a L3/L2 (a ratio of the long diameter L3 to the short diameter L2 in the ellipse on the circumferential surface) of 1.10.

A metal powder composed of Fe—Co—Si—B—P—Cu (Experiment No. 9) was produced using a metal powder producing apparatus 10 having an angle θ2 of 15 degrees and a L3/L2 of 1.04. Moreover, a metal powder composed of Fe—Co—Si—B—P—Cu (Experiment No. 11) was produced using a metal powder producing apparatus 10 having an angle θ2 of 40 degrees and a L3/L2 of 1.30.

In each experiment, the melting temperature was 1500° C., the gas spray pressure was 5 MPa, and the type of gas used was Argon. As the spiral flow condition, the pump pressure was 7.5 kPa. In the examples, it was possible to produce a metal powder having an average particle size of 24.9 to 26.2 μm, being comparatively small in each composition, and having a small variation. The average particle size was measured using a dry particle size distribution measuring device (HELLOS). Also, the crystal structure analysis of the metal powders produced by Experiment Nos. 7 to 14 was evaluated by a powder X-ray diffraction method. In the examples, amorphous metal powders were produced. The magnetic characteristics of the metal powders were measured by a coercivity (Oe) using an He meter. The results are shown in Table 1. Also, the thickness of the cooling liquid layer 50 was 30 mm, and the unevenness of the thickness in the core axis O direction was small.

When the L3/L2 was 1.04, the speed ratio (maximum speed/minimum speed) of the flow speed of the cooling liquid was about 1.07. When the L3/L2 was 1.10, the speed ratio of the flow speed of the cooling liquid was about 1.16. When the L3/L2 was 1.30, the speed ratio of the flow speed of the cooling liquid was about 1.20.

Reference Examples

Figure 5A:
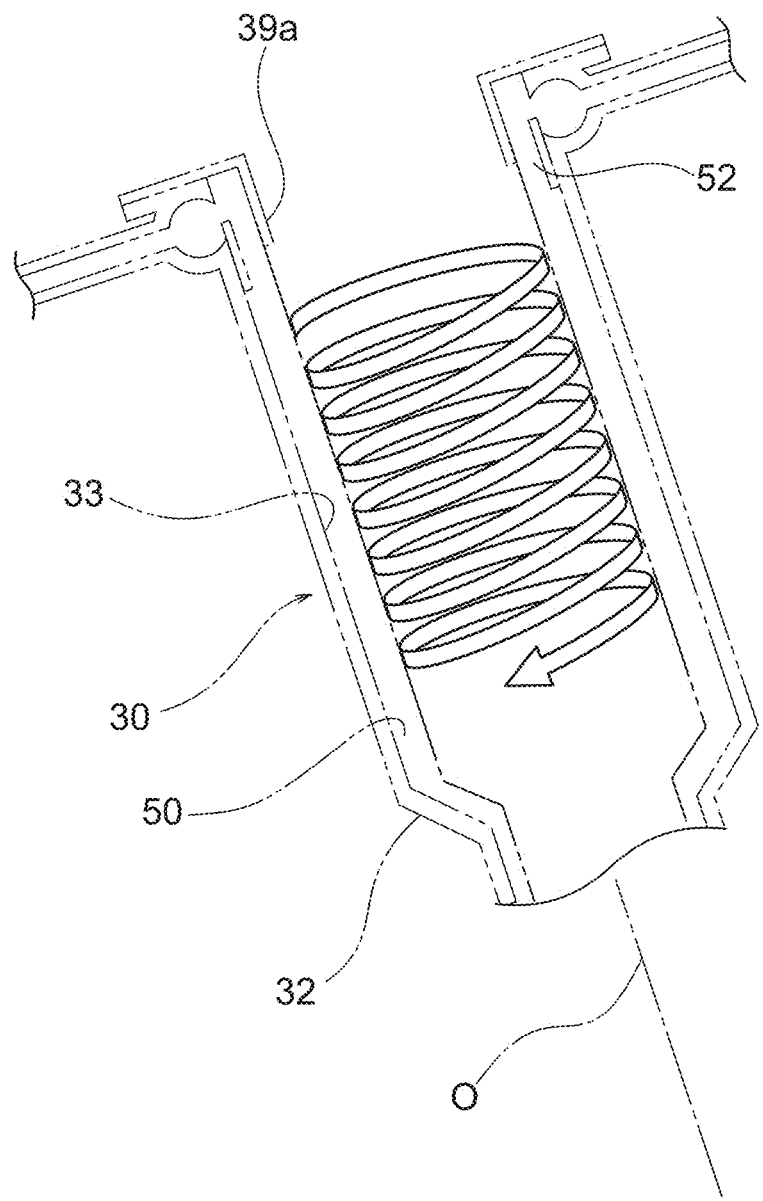
FIG. 5A is a schematic view of a cooling liquid flow in a conventional metal powder producing apparatus viewed from side.
Figure 5B:
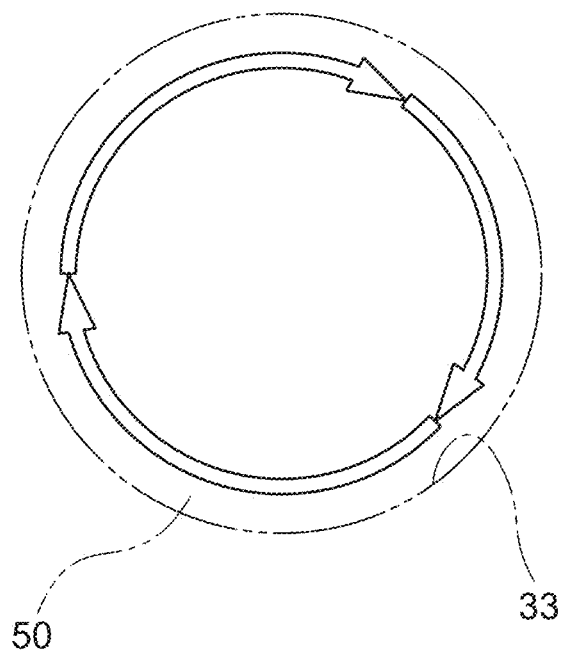
FIG. 5B is a schematic view of the cooling liquid flow shown in FIG. 5A viewed from above.

Metal powders (Experiment Nos. 1 to 6) were produced and evaluated similarly to the examples, except for, as shown in FIG. 5A and FIG. 5B, having a circular cross section (L3/L2=1.00) perpendicular to the core axis O of the inner circumference surface 33 of the cylinder body 32 and using a metal powder producing apparatus in which the lower end of the inner frame piece 39a of the cooling liquid introduction port defined a circular opening in a cross section perpendicular to the core axis O so that the cooling liquid discharge port 52 had a circular shape. Table 1 shows the results.

Comparing the examples with the reference examples in Table 1, as for the magnetic characteristics of the metal powders, the coercivity of the examples was smaller than that of the reference examples in a similar composition, and the magnetic characteristics of the examples were excellent. This result indicates that the magnetic characteristics were excellent despite the same pump pressure and the same flow amount of the cooling water as in the reference examples and is considered to be due to the following phenomenon.

In the metal powder producing apparatus of the reference examples, as shown in FIG. 5A and FIG. 5B, the cooling liquid flowing on the inner circumference surface forms a circular spiral cooling liquid layer. Thus, the flow speed of the cooling liquid on the inner circumference surface is considered to be substantially constant (the speed ratio of the flow speed of the cooling liquid is approximately 1.00). On the other hand, in the examples, as shown in FIG. 2A and FIG. 2B, the cooling water forms a substantially elliptical spiral cooling liquid layer 50. In the elliptical spiral cooling liquid layer 50, the flow speed is slower on the long diameter side and faster on the short diameter side, and the flow speed changes. Thus, the molten metal droplet sprayed against the cooling liquid layer 50 flows while changing the flow speed together with the cooling liquid layer. The vapor film around the droplet considered to be generated immediately after contact with the cooling liquid is easily peeled from the droplet due to the change in flow speed. This is because the rapid cooling effect of the droplet in the cooling liquid layer is enhanced.

TABLE 1

| Experiment No. | Ex./Comp. Ex. | Composition | L3/L2 | Particle Size (μm) | Crystal Structure | Coercivity (Oe) |
| --- | --- | --- | --- | --- | --- | --- |
| 1 | reference ex. | $Fe_{75}Si_{10}B_{15}$ | 1.00 | 24.2 | amorphous | 0.36 |
| 2 | reference ex. | $Fe_{73.5}Si_{13.5}B_9Nb_3Cu_1$ | 1.00 | 25.6 | amorphous | 1.41 |
| 3 | reference ex. | $Fe_{83.3}Si_4B_8P_4Cu_{0.7}$ | 1.00 | 24.9 | amorphous | 1.66 |

TABLE 1-continued

| Experiment No. | Ex./Comp. Ex. | Composition | L3/L2 | Particle Size (μm) | Crystal Structure | Coercivity (Oe) |
|---|---|---|---|---|---|---|
| 4 | reference ex. | $Fe_{84}Nb_7B_9$ | 1.00 | 26.3 | amorphous | 1.43 |
| 5 | reference ex. | $Fe_{90}Zr_7B_3$ | 1.00 | 25.4 | amorphous | 1.84 |
| 6 | reference ex. | $Fe_{58.31}Co_{24.99}Si_4B_8P_4Cu_{0.7}$ | 1.00 | 24.8 | amorphous | 1.40 |
| 7 | ex. | $Fe_{75}Si_{10}B_{15}$ | 1.10 | 24.9 | amorphous | 0.33 |
| 8 | ex. | $Fe_{73.5}Si_{13.5}B_9Nb_3Cu_1$ | 1.10 | 25.5 | amorphous | 1.30 |
| 9 | ex. | $Fe_{83.3}Si_4B_8P_4Cu_{0.7}$ | 1.04 | 25.0 | amorphous | 1.59 |
| 10 | ex. | $Fe_{83.3}Si_4B_8P_4Cu_{0.7}$ | 1.10 | 24.8 | amorphous | 1.55 |
| 11 | ex. | $Fe_{83.3}Si_4B_8P_4Cu_{0.7}$ | 1.30 | 24.7 | amorphous | 1.48 |
| 12 | ex. | $Fe_{84}Nb_7B_9$ | 1.10 | 26.2 | amorphous | 1.34 |
| 13 | ex. | $Fe_{90}Zr_7B_3$ | 1.10 | 25.6 | amorphous | 1.72 |
| 14 | ex. | $Fe_{58.31}Co_{24.99}Si_4B_8P_4Cu_{0.7}$ | 1.10 | 25.0 | amorphous | 1.31 |

DESCRIPTION OF THE REFERENCE NUMERICAL 10, 110 . . . metal powder producing apparatus
20 . . . molten metal supply unit
21 . . . molten metal
22 . . . container
23 . . . molten metal discharge port
24 . . . heating coil
26 . . . gas spray nozzle
27 . . . gas spray port
30, 130 . . . cooling unit
32 . . . cylinder body
32a . . . cylindrical member
33 . . . inner circumference surface
34 . . . discharge port
35 . . . ring
36 . . . cooling liquid introduction unit
37 . . . supply line
38 . . . frame
39a . . . inner frame piece
39b . . . frame support piece
40 . . . auxiliary cylinder body
42 . . . passage portion
44 . . . outside space
45 . . . outer-frame formation member
46 . . . inside space
50 . . . cooling liquid layer
52 . . . cooling liquid discharge port

What is claimed is:

1. A metal powder producing apparatus comprising:
a molten metal supply unit configured to discharge a molten metal;
a cylinder body configured such that the molten metal discharged from the molten metal supply unit is received in the cylinder body; and
a cooling liquid introduction unit configured to supply a cooling liquid to an upper portion of an inner circumference surface of the cylinder body, wherein
the cylinder body and the cooling liquid introduction unit are configured such that a layer of the cooling liquid is formed on the inner circumference surface,
a core axis direction of the cylinder body is inclined with respect to a vertical direction when the metal powder producing apparatus is in a use position,
the upper portion of the inner circumference surface has an elliptical shape in planes perpendicular to the vertical direction,
the cooling liquid introduction unit includes a cooling liquid discharge port configured to discharge the cooling liquid, supplied from outside the cylinder body, in a flow of the cooling liquid, which is a spiral orbit flow along the upper portion of the inner circumference surface,
the cooling liquid discharge port has the elliptical shape in the planes perpendicular to the vertical direction, and
a ratio of a long diameter to a short diameter in an ellipse defined by the inner circumference surface and the cooling liquid discharge port in the planes perpendicular to the vertical direction is 1.04 or more and 3.00 or less.

2. The metal powder producing apparatus according to claim 1, wherein the cooling liquid discharge port has the elliptical shape over a circumference direction of the cylinder body.

3. The metal powder producing apparatus according to claim 1, wherein
the cooling liquid introduction unit includes a frame for changing the flow of the cooling liquid from outside toward inside to the flow of the cooling liquid along the upper portion of the inner circumference surface of the cylinder body, and
the frame includes an elliptical inner frame piece having a diameter smaller than that of the inner circumference surface of the cylinder body.

4. The metal powder producing apparatus according to claim 3, wherein
the frame defines an inside space inside the cylinder body to receive the cooling liquid from the outside to the inside of the cylinder body, and
the inside space has the elliptical shape along the inner circumference surface.

5. The metal powder producing apparatus according to claim 1, wherein
the cooling liquid introduction unit includes an outside formation member with an outside space for temporarily storing the cooling liquid,
the outside formation member is outside the cylinder body, and
the outside space has the elliptical shape.

6. The metal powder producing apparatus according to claim 1, wherein a center of an ellipse defined by the inner circumference surface is displaced so as to be inclined to a vertical line toward a lower part of the cylinder body.

7. A metal powder producing method using the metal powder producing apparatus according to claim 1, the method comprising steps of:
forming the layer of a cooling liquid whose flow speed changes along the inner circumference surface of the cylinder body;
discharging the molten metal from the molten metal supply unit toward the layer of the cooling liquid; and flowing the molten metal together with the cooling liquid while changing their flow speed.

8. The metal powder producing method according to claim 7, wherein the layer of the cooling liquid is formed by flowing the cooling liquid in a substantially elliptical spiral manner along the inner circumference surface.

* * * * *